United States Patent
Porcheron et al.

(10) Patent No.: US 9,561,487 B2
(45) Date of Patent: Feb. 7, 2017

(54) PERFORMANCE TRAPPING MASS AND USE THEREOF IN HEAVY METAL TRAPPING

(75) Inventors: Fabien Porcheron, Rueil Malmaison (FR); Karin Barthelet, Lyons (FR); Arnaud Baudot, Vernaison (FR); Antoine Daudin, Corbas (FR); Marc-Antoine Lelias, Ales (FR); Yannick Gelie, Lyons (FR); Alexandre Nicolaos, Courbevoie (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 271 days.

(21) Appl. No.: 14/349,081

(22) PCT Filed: Sep. 12, 2012

(86) PCT No.: PCT/FR2012/000361
§ 371 (c)(1),
(2), (4) Date: Jun. 6, 2014

(87) PCT Pub. No.: WO2013/050667
PCT Pub. Date: Apr. 11, 2013

(65) Prior Publication Data
US 2015/0034561 A1 Feb. 5, 2015

(30) Foreign Application Priority Data
Oct. 4, 2011 (FR) ..................... 11 03016

(51) Int. Cl.
*B01D 53/64* (2006.01)
*B01J 20/00* (2006.01)
(Continued)

(52) U.S. Cl.
CPC ............... *B01J 20/08* (2013.01); *B01D 15/10* (2013.01); *B01D 53/02* (2013.01); *B01D 53/64* (2013.01);
(Continued)

(58) Field of Classification Search
CPC ..... B01J 20/0285; B01J 20/0237; B01J 20/08; B01J 20/284; B01J 20/30; B01J 20/3291; B01D 53/64; C10G 25/003; C10L 3/101
See application file for complete search history.

(56) References Cited

U.S. PATENT DOCUMENTS

| 4,094,777 A | 6/1978 | Sugier et al. |
| 6,033,556 A | 3/2000 | Didillon et al. |

(Continued)

FOREIGN PATENT DOCUMENTS

| FR | 2335257 A2 * | 7/1977 | ............. B01D 15/00 |
| FR | 2764214 A1 | 12/1998 | |

(Continued)

OTHER PUBLICATIONS

International Preliminary Report and Written Opinion from PCT/FR2012/000361 dated Nov. 8, 2012.*

(Continued)

*Primary Examiner* — Timothy Vanoy
(74) *Attorney, Agent, or Firm* — Millen, White, Zelano and Branigan, P.C.

(57) ABSTRACT

The present invention concerns the elimination of heavy metals, in particular mercury and possibly arsenic and lead, present in a gaseous or liquid effluent by means of a capture mass comprising a support essentially based on alumina obtained by the gel method and at least one element selected from the group constituted by copper, molybdenum, tungsten, iron, nickel and cobalt. The invention is advantageously applicable to the treatment of gas of industrial origin, synthesis gas, natural gas, gas phase condensates and liquid hydrocarbon feeds.

17 Claims, 2 Drawing Sheets

(51) Int. Cl.
| | |
|---|---|
| *B01J 20/30* | (2006.01) |
| *C10G 25/00* | (2006.01) |
| *C10L 3/10* | (2006.01) |
| *B01J 20/08* | (2006.01) |
| *B01D 53/02* | (2006.01) |
| *B01J 20/32* | (2006.01) |
| *B01J 20/28* | (2006.01) |
| *B01J 20/02* | (2006.01) |
| *B01D 15/10* | (2006.01) |

(52) U.S. Cl.
CPC ......... *B01J 20/0218* (2013.01); *B01J 20/0225* (2013.01); *B01J 20/0237* (2013.01); *B01J 20/0285* (2013.01); *B01J 20/28004* (2013.01); *B01J 20/28016* (2013.01); *B01J 20/28047* (2013.01); *B01J 20/28057* (2013.01); *B01J 20/28059* (2013.01); *B01J 20/28061* (2013.01); *B01J 20/28069* (2013.01); *B01J 20/28071* (2013.01); *B01J 20/28073* (2013.01); *B01J 20/28088* (2013.01); *B01J 20/3007* (2013.01); *B01J 20/3014* (2013.01); *B01J 20/3078* (2013.01); *B01J 20/3085* (2013.01); *B01J 20/3204* (2013.01); *B01J 20/3236* (2013.01); *C10G 25/003* (2013.01); *C10L 3/101* (2013.01); *B01D 2251/60* (2013.01); *B01D 2253/104* (2013.01); *B01D 2253/1128* (2013.01); *B01D 2253/25* (2013.01); *B01D 2253/31* (2013.01); *B01D 2253/311* (2013.01); *B01D 2256/24* (2013.01); *B01D 2257/602* (2013.01); *B01D 2258/0283* (2013.01); *C10L 2290/541* (2013.01); *Y10T 428/2982* (2015.01)

(56) References Cited

U.S. PATENT DOCUMENTS

| | | | | |
|---|---|---|---|---|
| 7,645,306 | B2* | 1/2010 | Kanazirev | C10G 25/003 423/210 |
| 8,876,952 | B2* | 11/2014 | Simonetti | C10L 3/101 95/134 |
| 8,969,240 | B2* | 3/2015 | Hetherington | B01D 15/00 502/400 |
| 9,339,787 | B2* | 5/2016 | Porcheron | B01J 20/0266 |
| 2015/0182911 | A1* | 7/2015 | Fish | B01J 20/2803 423/210 |
| 2015/0217271 | A1* | 8/2015 | Kanazirev | B01D 15/00 252/190 |
| 2016/0001258 | A1* | 1/2016 | Fish | B01D 53/64 208/253 |

FOREIGN PATENT DOCUMENTS

| | | | | |
|---|---|---|---|---|
| GB | 1025038 | A * | 4/1966 | B01J 20/08 |
| SU | 967546 | A * | 10/1982 | B01J 20/02 |

OTHER PUBLICATIONS

International Search Report from PCT/FR2012/000361 dated Nov. 8, 2012.

* cited by examiner

PERFORMANCE TRAPPING MASS AND USE THEREOF IN HEAVY METAL TRAPPING

FIELD OF THE INVENTION

The present invention relates to a capture mass for heavy metals, in particular mercury and possibly arsenic and lead, present in a gaseous or liquid effluent. It also relates to the preparation of said capture mass and the process for the elimination of heavy metals using that capture mass comprising a support essentially based on alumina obtained by the gel method and at least one element selected from the group constituted by copper, molybdenum, tungsten, iron, nickel and cobalt. The invention is advantageously applicable to the treatment of gas of industrial origin, synthesis gas, natural gas, gas phase condensates and liquid hydrocarbon feeds.

PRIOR ART

Mercury is a metallic contaminant which is found in gaseous or liquid hydrocarbons produced in many regions of the world, such as the Gulf of Niger, South America or North Africa.

Eliminating mercury from hydrocarbon cuts is desirable industrially for several reasons: the safety of the operators, since elemental mercury is volatile and presents serious risks of neurotoxicity by inhalation while its organic forms present similar risks by skin contact; and also for reasons of preventing the deactivation of heterogeneous catalysts used to upgrade such liquid hydrocarbon cuts, since mercury amalgamates very easily with noble metals such as platinum or palladium which are used in the form of nanoparticles dispersed on porous supports that can be used in catalytic operations as diverse as the selective hydrogenation of olefins produced by steam cracking or catalytic cracking of liquid hydrocarbons.

Industrially, the elimination of mercury from liquid or gaseous hydrocarbon cuts is carried out by allowing them to move through beds of capture masses. The term "capture mass" as used in the present invention means any type of solid containing within it or on its surface an active element that is capable of reacting irreversibly with an impurity, such as mercury, contained in the feed to be purified. That reaction is specific in that the product of that reaction is insoluble in the effluent to be purified and retained in or at the surface of the capture mass.

Frequently, the performance of a capture mass in a purification process is characterized by the dynamic capacity, i.e. the capacity of it to maintain a minimum level of performance for as long an operational period as possible. This performance is defined by the efficiency, E, in accordance with the formula:

$$E(\%) = [([M]_0 - [M]_S)/[M]_0] \times 100$$

where $[M]_S$ is the concentration of metal in the effluent at the outlet from the bed and $[M]_0$ is the concentration of metal in the effluent at the inlet to the bed.

Purification processes are tasked with maintaining extremely high levels of efficiency for as long a time as possible. The target efficiencies may be as high as 99.9%; in general, when the efficiency drops below 99.0%, it is often considered that the capture mass is no longer effective and that it is necessary to proceed to its replacement.

The skilled person will be aware that the capture of heavy metals such as mercury may be carried out easily by reacting mercury with a metallic sulphide, examples of which are: iron sulphide, or copper sulphide of the CuS type. U.S. Pat. No. 7,645,306 B2 demonstrated that copper sulphide, CuS, reacts irreversibly with elemental mercury in the following manner:

$$Hg^0 + 2CuS \rightarrow Cu_2S + HgS \quad (1)$$

Reaction (1) is spontaneous and has a free energy $\Delta G$ (kJ/mole) which is negative over a wide temperature range, typically from 0° C. to 300° C. (data obtained from thermochemical databanks in the HSC Chemistry 7 software, Outotec, Outotec Oyj, Riihitontuntie 7 D, PO Box 86, FI-02200 Espoo, Finland).

However, cupric copper sulphide (in oxidation state (I), $Cu_2S$) formed during the reaction of CuS with mercury, does not react with mercury, as demonstrated in U.S. Pat. No. 7,645,306 B2. In fact, reaction (2) has a positive characteristic free energy over a very wide temperature range, typically 25° C. to 300° C. (data obtained from thermochemical databanks in the HSC Chemistry 7 software, Outotec, Outotec Oyj, Riihitontuntie 7 D, PO Box 86, FI-02200 Espoo, Finland).

$$Cu_2S + Hg^0 \rightarrow Cu + HgS \quad (2)$$

This absence of reaction has also been confirmed experimentally in Martarello, P J; Moore G A; Peterson E S; Abbott E H; Gorenbain A E (2001): Environmental application of mineral sulfides for removal of gas-phase Hg(0) and aqueous $Hg_2$, Separation Science and Technology, 36:5, 1183-1196. Those authors have experimentally shown that CuS reacts with gaseous mercury in accordance with a stoichiometry which corresponds to adsorption of one mole of mercury vapour for two moles of CuS. In addition, X-ray diffraction analysis (XRD) at the end of the reaction of CuS with mercury reveals the presence of $Cu_2S$ and the absence of CuS, which confirms that reaction (1) is favourable and complete.

Porous aluminas constitute the supports of choice in the formulation of capture masses for heavy metals such as mercury. The alumina supports can principally be synthesized by two pathways:

by rapid dehydration of an aluminium trihydroxide type precursor $(Al(OH)_3)$ from the Bayer process—also known as hydrargillite or gibbsite—, followed by shaping, for example by granulation, then a hydrothermal treatment and finally calcining, which leads to the production of alumina (P Euzen, P Raybaud, X Krokidis, H Toulhoat, J L Le Loarer, J P Jolivet, C Froidefond, Alumina, in "Handbook of Porous Solids", Eds F Schüth, K S W Sing, J Weitkamp, Wiley-VCH, Weinheim, Germany, 2002, pp 1591-1677). In the text, we shall refer to these aluminas as flash aluminas;

by a process for the production of a gel constituted by a precursor of the aluminium gamma-oxy(hydroxide) (AlO(OH)) type—also known as boehmite—with high specific surface areas in the range 150 to 600 $m^2/g$, which is then shaped, for example by mixing-extrusion, before undergoing a series of heat treatments or hydrothermal treatments leading to the production of the alumina. The boehmite gel may, for example, be obtained by precipitation of basic and/or acidic solutions of aluminium salts induced by a change in pH or any other method known to the skilled person (P Euzen, P Raybaud, X Krokidis, H Toulhoat, J L Le Loarer, J P Jolivet, C Froidefond, Alumina, in "Handbook of Porous Solids", Eds F Schüth, K S W Sing, J Weitkamp, Wiley-VCH, Weinheim, Germany, 2002, pp 1591-1677). In the text, we shall refer to these aluminas as gel alumina or alumina gel.

The texture, structure and chemical composition of the aluminas obtained by the two pathways described above are very different.

The term "texture" as used in the present invention means the pore diameter distribution feature; it is generally very broad for flash aluminas and generally comprises a significant fraction (>20%) of the pore volume in macroporous and/or microporous domains (Zotin J L & Faro Jr A C, 1991, Effect of basicity and pore size distribution of transition aluminas on their performance in the hydrogen sulphide-sulphur dioxide reaction, Applied Catalysis, 75, 57-73). The microporous volume is constituted by the cumulative volume of pores of the alumina with a diameter of less than 0.002 µm as defined by IUPAC (International Union of Pure and Applied Chemistry), while the macroporous volume corresponds to the cumulative volume of pores of alumina with a diameter of more than 0.05 µm as defined by IUPAC.

If Vx is defined as the characteristic pore volume of a porous support (mL/g) corresponding to the cumulative volume of its porosity characterized in that the diameter of the pores, over all of the pores of the support, is more than x (in µm), flash aluminas are characterized by a ratio $V_{0.005}/V_{0.03}$<2 (Zotin J L & Faro Jr A C, 1991, Effect of basicity and pore size distribution of transition aluminas on their performance in the hydrogen sulphide-sulphur dioxide reaction, Applied Catalysis, 75, 57-73) (P Euzen, P Raybaud, X Krokidis, H Toulhoat, J L Le Loarer, J P Jolivet, C Froidefond, Alumina, in "Handbook of Porous Solids", Eds F Schüth, K S W Sing, J Weitkamp, Wiley-VCH, Weinheim, Germany, 2002, pp 1591-1677).

In contrast, gel aluminas generally have pore diameter distributions centred in the mesoporous domain as defined by IUPAC with a dispersion in terms of pore diameter which is much narrower than in the case of flash aluminas (Johnson M F and Mooi J (1968) "The origin and types of pores in some alumina catalysts", Journal of Catalysis, 10, 342-354), which makes them completely different from flash aluminas from a textural point of view.

Flash dehydration of aluminium trihydroxide at temperatures below 850° C. gives rise to transition alumina structures of the rho, eta and khi type, while the synthesis of alumina gel principally gives rise to gamma type alumina structures when the precursor gel is calcined at a temperature below 850° C. (Pearson A, Aluminium Oxide (alumina), activated, Kirk-Othmer Encyclopaedia of Chemical Technology, Vol 2, pp 391-403, Wiley & Sons).

Finally, the chemical composition of flash aluminas has more sodium than that of gel aluminas. In fact, flash aluminas contain strictly more than 700 ppm ($Na_2O$ equivalents) of sodium and less than 0.5% of $Na_2O$, while this quantity is 700 ppm or less ($Na_2O$ equivalents) in the case of gel aluminas (P Euzen, P Raybaud, X Krokidis, H Toulhoat, J L Le Loarer, J P Jolivet, C Froidefond, Alumina, in "Handbook of Porous Solids", Eds F Schüth, K S W Sing, J Weitkamp, Wiley-VCH, Weinheim, Germany, 2002, pp 1591-1677).

Further, U.S. Pat. No. 6,033,556 (Didillon, Kasztelan, Harle, 2000) indicates that alumina gel type supports are not suitable for applications involving the elimination of heavy metals such as mercury. The technical limitations of that type of support cited in that patent concern problems linked to capillary condensation as well as diffusional limitations linked to the porosity profile of the support. It is in fact known that gel aluminas have a distribution of pore diameters centred on smaller values than in the case of flash aluminas. This feature favours capillary condensation. In addition, the pore diameter distribution of gel aluminas, centred on smaller values than in the case of flash aluminas, leads to a reduction in the accessibility of mercury to the core of the gel alumina type supports due to diffusional limitations. U.S. Pat. No. 6,033,556 thus explicitly discourages the use of gel alumina type supports in the formulation of capture masses for heavy metals such as mercury or arsenic.

Surprisingly, the Applicant has discovered that using capture masses of the invention based on gel alumina can produce improved adsorption performances for heavy metals, in particular mercury. The capture mass of the invention has improved performances in that the quantity of mercury captured by said mass is greater than the quantity imposed by the stoichiometry of reaction (1) described above. In addition, the Applicant has discovered that using a capture mass in accordance with the invention based on gel alumina in a fixed non-regeneratable bed type process can produce improved adsorption performances in that the dynamic capacity is higher than that of adsorbents using aluminas obtained by the flash pathway. The use of the capture mass of the invention is of major interest and advantage in all processes for the treatment of gaseous or liquid effluents for the elimination of heavy metals, particularly mercury, present in these feeds; arsenic and lead may also be cited.

SUMMARY OF THE INVENTION

The present invention thus concerns a capture mass for heavy metals, in particular for mercury, optionally for arsenic and for lead, present in a gaseous or liquid effluent. It also concerns the preparation of said capture mass and a process for the elimination of heavy metals by means of this capture mass comprising a support essentially based on alumina obtained by the gel method and at least one element selected from the group constituted by copper, molybdenum, tungsten, iron, nickel and cobalt.

More particularly, the present invention concerns a capture mass for heavy metals, in particular for mercury, contained in a gaseous or liquid feed, said mass containing a porous support essentially based on alumina obtained by the gel method, at least one metal M present at least in part in a $M_xS_y$ sulphide form, said metal M being selected from the group constituted by copper, molybdenum, tungsten, iron, nickel and cobalt.

Advantageously in accordance with the invention, said porous support comprises a quantity of sodium in the range 1 to 700 ppm by weight of sodium ($Na_2O$ equivalent) and has a pore diameter distribution such that:

0.4 mL/g<$V_{0.01}$<0.8 mL/g;

and $V_{0.005}/V_{0.03}$>1;

$V_x$ being the pore volume of the porous support (mL/g) corresponding to the cumulative volume of its porosity, characterized in that the pore diameter, taken over the whole of the pores of the support, is more than x (in µm).

The present invention has the advantage of eliminating heavy metals such as mercury, arsenic or lead from a gaseous or liquid effluent by using a specific capture mass the adsorbent properties of which are far superior to those of reference capture masses used in particular in natural gas processing applications. Because of its characteristics, the alumina gel support used in the present invention acts as a dispersant for the $M_xS_y$ active phase and has final textural properties which are compatible with the constraints linked to capillary condensation and to the capture of heavy metals.

The Applicant has in fact discovered that the capture mass of the invention has the advantage of adsorbing larger quantities of mercury per gram of active phase $M_xS_y$ than could be obtained with any other capture mass using a mercury chemisorption step and reaction (1) for the same quantity of $M_xS_y$ active phase. The use of a capture mass of the invention means that more heavy metals can be captured from a gaseous or liquid feed and thus the feed to be treated can be purified more effectively, and thus the investment costs can be reduced because a smaller volume of adsorbents can be used to treat a gaseous or liquid feed containing heavy metals.

Other characteristics and advantages of the invention will be better understood and will become apparent from the following description.

DETAILED DESCRIPTION OF THE INVENTION

The present invention concerns a formulation for a capture mass for heavy metals, in particular for mercury contained in a gaseous or liquid feed, said mass containing a porous support essentially based on alumina obtained by the gel method, at least one metal M present at least in part in a $M_xS_y$ sulphide form, said metal M being selected from the group constituted by copper, molybdenum, tungsten, iron, nickel and cobalt. Preferably, said element is selected from the group constituted by copper, molybdenum, iron and cobalt, more preferably from the group constituted by copper and iron. Highly preferably, the metal M is copper.

The porous support based on alumina gel may be obtained from aluminium oxy(hydroxide).

Said support for the capture mass of the present invention advantageously comprises a quantity of sodium in the range 1 to 700 ppm by weight of sodium ($Na_2O$ equivalents) and has a pore diameter distribution such that:

0.4 mL/g<$V_{0.01}$<0.8 mL/g;
and $V_{0.005}/V_{0.03}$>1;

$V_x$ being the pore volume of the porous support (mL/g) corresponding to the cumulative volume of its porosity, characterized in that the pore diameter, taken over the whole of the pores of the support, is more than x (in µm).

The fraction of metal contained in the sulphide form $M_xS_y$ constituting the active phase preferably satisfies x≤2, more preferably x≤1; highly preferably, x=1. The fraction of sulphur contained in the sulphide form $M_xS_y$ preferably satisfies y≤2, more preferably y≤1, and highly preferably y=1. More advantageously, the capture mass of the invention is such that the fraction of metal and the fraction of sulphur in the sulphide form obeys the equations x=1 and y=1.

The capture mass of the invention preferably has at least 90% (mole/mole) of the metal M in the sulphide form $M_xS_y$, more preferably at least 95% (mole/mole) of metal M in the sulphide form $M_xS_y$.

The capture mass of the invention advantageously has a total pore volume in the range 0.20 to 1 cm³/g, preferably in the range 0.40 to 0.80 cm³/g; the specific surface area of the capture mass of the invention, determined by the BET method, is advantageously in the range 20 to 400 m²/g, preferably in the range 50 to 390 m²/g, more preferably in the range 60 to 380 m²/g, still more preferably in the range 130 to 380 m²/g and still more preferably in the range 150 to 320 m²/g.

$V_x$ is defined as the characteristic pore volume of a porous support (mL/g) corresponding to the cumulative volume of its porosity characterized in that the diameter of the pores, taken over the whole of the pores of the support, is more than x (in µm). The pore volume $V_x$ is determined by mercury porosimetry in accordance with ASTM standard D4284-92 with a wetting angle of 140° using, for example, an Autopore III™ instrument from Micrometrics™. The gel alumina supports of the capture mass of the invention have a pore diameter distribution such that:

0.4 mL/g<$V_{0.01}$<0.8 mL/g; and
$V_{0.005}/V_{0.03}$>1.

Preferably, the gel alumina supports of the capture mass of the invention have a pore diameter distribution such that:
0.48 mL/g<$V_{0.01}$<0.75 mL/g; and
$V_{0.005}/V_{0.03}$>1.8.

More preferably, the gel alumina supports of the capture mass of the invention have a pore diameter distribution such that:
0.48 mL/g<$V_{0.01}$<0.75 mL/g; and
$V_{0.005}/V_{0.03}$>2.

In accordance with the invention, the gel alumina support of the capture mass contains a quantity of sodium which is at least 700 ppm ($Na_2O$ equivalents) or less by weight with respect to the gel alumina support, preferably a quantity of sodium of at least 200 ppm ($Na_2O$ equivalents) or less, preferably a quantity of sodium of at least 100 ppm ($Na_2O$ equivalents) by weight or less. Preferably, the alumina gel support contains in the range 2 to 50 ppm of sodium ($Na_2O$ equivalents).

Preferably, the proportion by weight of metal in the sulphide state with respect to the capture mass is in the range 1% to 60%, preferably in the range 5% to 40% and highly preferably in the range 10% to 30%.

Preferred constituent metals of the active phase belong to the group constituted by copper, molybdenum, iron, nickel, tungsten and cobalt. Preferably, the metal M is selected from the group constituted by copper, molybdenum, iron and cobalt, more preferably from the group constituted by copper and iron. Still more preferably, the active phase is at least entirely constituted by copper.

The capture mass of the invention may be in the form of a bead, cylinder, multilobe, cart wheel, hollow cylinder or any other geometric shape used by the skilled person. Preferably, the capture mass of the invention is in the form of extrudates in the form of cylinders, trilobes or multilobes. Said extrudates preferably have diameters that are generally in the range 0.4 to 100 mm, preferably in the range 0.5 to 100 mm, preferably in the range 0.5 to 50 mm and more preferably in the range 0.5 to 10 mm.

The support is constituted by alumina gel, i.e. an alumina that has been obtained from an aluminium oxy(hydroxide) type precursor, for example from gamma aluminium oxy(hydroxide) or delta aluminium oxy(hydroxide).

In a preferred variation, the support for the capture mass of the invention is constituted by at least 50% by weight of gamma alumina, preferably at least 99% of gamma alumina.

In another variation of the invention, the support for the capture mass is constituted by at least 50% by weight of delta alumina, preferably 80% delta alumina.

In a more preferred variation, the support for the capture mass of the invention is constituted by 100% alumina gel obtained from a precursor of the aluminium oxy(hydroxide) type advantageously characterized by a specific surface area in the range 150 to 600 m$^2$/g, preferably in the range 200 to 400 m$^2$/g, more preferably in the range 150 to 320 m$^2$/g.

The present invention also pertains to a process for the preparation of the capture mass described hereinabove. The method for synthesizing the capture mass of the invention comprises the following steps:
a) bringing an aqueous solution of acidic aluminium salts into contact with an alkaline solution of aluminium salts or bringing an aqueous solution of acidic aluminium salts into contact with a basic solution, preferably of the sodium hydroxide or potassium hydroxide type, or bringing an aqueous solution of basic aluminium salts into contact with an acidic solution, preferably of the nitric acid type;
b) shaping the alumina gel support obtained from step a) by mixing the gel in an acidic or basic medium to transform the product into a paste, followed by passing said paste through a die in order to obtain extrudates;
c) drying the alumina support obtained at the end of step b) advantageously in the range 70° C. to 150° C., followed by calcining it, advantageously in the range 250° C. to 1300° C.;
d) preparing an aqueous solution containing at least one precursor of dissolved metals selected from the group constituted by copper, molybdenum, tungsten, iron, nickel and cobalt;
e) impregnating the solution obtained from step d) onto the alumina support obtained from step c);
f) maturing the impregnated support from step e) in a closed vessel saturated with water at a temperature which is advantageously in the range 20° C. to 60° C., for a duration which is advantageously in the range 0.5 h to 8 h;
g) drying the solid from step f), advantageously in the range 70° C. to 250° C.

In a variation of the process of the invention, the preparation of the capture mass comprises, at the end of step g), a supplemental step h) comprising calcining in air at high temperature, typically in the range 300° C. to 800° C., preferably in a dry atmosphere, preferably at a temperature in the range 350° C. to 600° C.

Preferably during step h), the solid is calcined in air with a relative humidity at 25° C. in the range 10% to 80%, preferably in the range 15% to 50%.

In accordance with the preparation process of the invention, the capture mass in the oxide state obtained from step g) or step h) undergoes a step i) for final sulphurization to place it in the active form, M$_x$S$_y$, for capturing heavy metals. This sulphurization step may be carried out using any method leading to the formation of metal sulphides and preferably to the formation of the CuS phase when copper is being used. The sulphur is generally added by the hydrogen sulphide or any organo-sulphide precursor known to the skilled person. The sulphurization step is carried out in the gas phase ex-situ or in-situ; preferably, it is carried out in the gas phase ex-situ, i.e. outside the capture unit. Preferably, the final sulphurization of step i) is carried out at atmospheric pressure.

Advantageously, the capture mass in the oxide state is sulphurized using a gaseous mixture of nitrogen and hydrogen sulphide in a molar concentration in the range 1000 ppm to 10%, preferably in the range 0.5% to 6%, at a temperature in the range 100° C. to 400° C., preferably in the range 120° C. to 250° C.

Preferably, the degree of sulphurization of the capture mass, defined as the ratio of the number of moles of sulphur contained in the capture mass over the number of moles of metal contained in the capture mass in the oxide state, is 0.85 or more, preferably 0.95 or more and more preferably more than 0.98. Advantageously, the degree of sulphurization is equal to 1.

Advantageously, in accordance with the process for the preparation of the capture mass, the acid salts used in step a) are selected from the group constituted by aluminium sulphate, aluminium nitrate and aluminium chloride. Preferably, said acid salt is aluminium sulphate. In step a), the alkaline solution of aluminium salts is selected form the group constituted by sodium aluminate and potassium aluminate. In a highly preferred variation, the gel of step a) is obtained by bringing a sodium aluminate solution into contact with nitric acid. The sodium aluminate solution advantageously has a concentration in the range 10$^{-5}$ to 10$^{-1}$ mole/L; more preferably, this concentration is in the range 10$^{-4}$ to 10$^{-2}$ mole/L. Step a) is advantageously carried out at a temperature in the range 5° C. to 80° C. and at a pH in the range 6 to 10. Preferably, the temperature of step a) is in the range 35° C. to 70° C. and the pH is in the range 6 to 10.

During step b) of the preparation process of the invention, mixing, preferably in an acid medium (3<pH<7), is carried out in various tools known to the skilled person, such as Z arm mixers, mixing pan mills, continuous single or twin screws, in order to transform the gel into a product known as a paste. Passing the paste through a die can produce extrudates with a diameter that is advantageously in the range 0.4 to 100 mm, preferably in the range 0.5 to 100 mm, more preferably in the range 0.5 to 10 mm and still more preferably in the range 0.4 to 4 mm and with different shapes such as a cylinder, preferably multilobes, more preferably trilobes.

Drying the alumina support obtained at the end of step b) in step c) is preferably carried out in the range 80° C. to 120° C. Advantageously, subsequent calcining during step c) is carried out in the range 450° C. to 950° C., more preferably in the range 450° C. to 700° C., still more preferably in the range 450° C. to 600° C.

In a variation of the invention, one or more thermal post-treatments (calcining, hydrothermal treatment, autoclaving in the presence or absence of a peptizing agent such as nitric acid or acetic acid, etc) are carried out on the extrudates obtained during the first drying and calcining phase of step c). The post-treatments are preferably carried out at a temperature in the range 50° C. to 1300° C., preferably in the range 100° C. to 1200° C. or even in the range 500° C. to 1000° C., for a period in the range 0.5 h to 8 h in the presence of water, preferably in the range 3 h to 6 h, more preferably in the range 3 to 5 h.

Advantageously, step d) is carried out by adjusting the quantities of precursors as a function of the quantity of metal desired on the mass in the final state. In the case in which the metal is copper, the precursors are selected from the group constituted by copper carbonate, copper hydroxide, copper nitrate, copper hydroxy nitrate, copper chloride, copper acetate and copper citrate. Preferably, the copper precursor is copper nitrate. More preferably, the copper precursor is copper citrate.

In a preferred variation of the preparation process, during step e), the metallic precursor solution is introduced by dry impregnation.

Maturation of the impregnated support obtained from step e) in the closed water-saturated vessel is preferably carried out during step f) at a temperature in the range 25° C. to 50° C. for a period in the range 1 h to 4 h. The solid obtained from step f) is preferably dried between 70° C. and 130° C., preferably in the range 70° C. to 110° C.

The capture mass of the invention has the advantage of adsorbing larger quantities of mercury per gram of active phase $M_xS_y$ than that which may be obtained using any other capture mass employing a step for chemisorption of mercury by reaction (1) for the same quantity of active phase $M_xS_y$.

This extra capacity is expressed by the relationship:

$$\Delta[Hg]=[([Hg]_f-[Hg]_{th})/[Hg]_{th}]\times 100$$

where $[Hg]_f$ is the quantity of mercury adsorbed by the capture mass, expressed as the relative weight with respect to the initial mass of the capture mass, i.e. the ratio of the quantity by weight of mercury over the weight of the capture mass; and $[Hg]_{th}$ is the quantity of mercury, expressed as the relative weight with respect to the initial mass of the capture mass, which can theoretically be absorbed in the capture mass according to the stoichiometry defined by the reaction (1). The extra capacity $\Delta Hg$ is in the range 1% to 100%. Preferably, $1<\Delta Hg<50\%$ and more preferably, $1<\Delta Hg<30\%$.

The present invention also pertains to a fixed bed process for the elimination of heavy metals such as mercury, arsenic or lead from a gaseous or liquid effluent, by bringing the capture mass described hereinabove into contact with the effluent to be treated.

Figure 1:
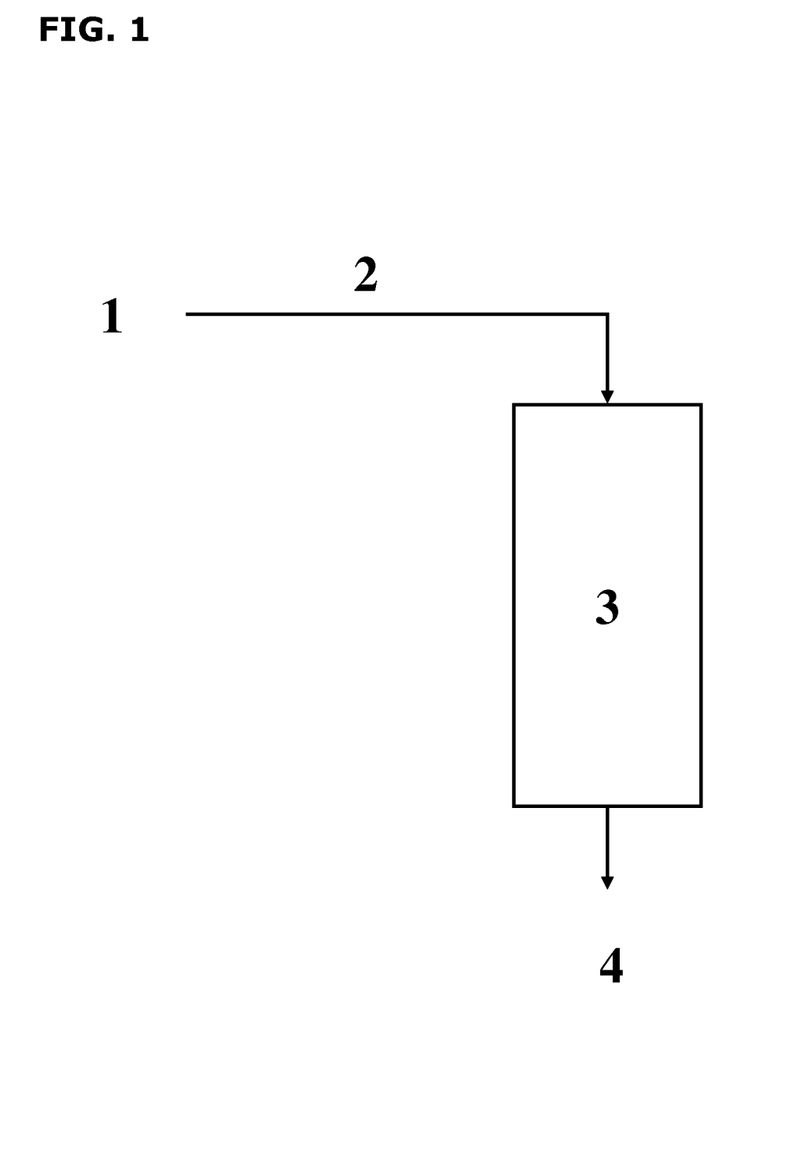
FIG. 1—Represents a schematic process of the invention.

In a first variation, the process for the use of the capture mass of the invention is carried out using the various steps referred to in FIG. 1, namely a liquid or gaseous effluent 1 is introduced via a line 2 into a bed comprising at least the capture mass 3 of the invention described above. The bed of capture mass adsorbs the mercury contained in the effluent so as to obtain, at the outlet from said bed, an effluent 4 which is cleansed of mercury, i.e. the concentration of mercury in the effluent at the outlet from the fixed bed is less than the concentration of mercury in the effluent at the inlet to the capture mass bed.

Figure 2:
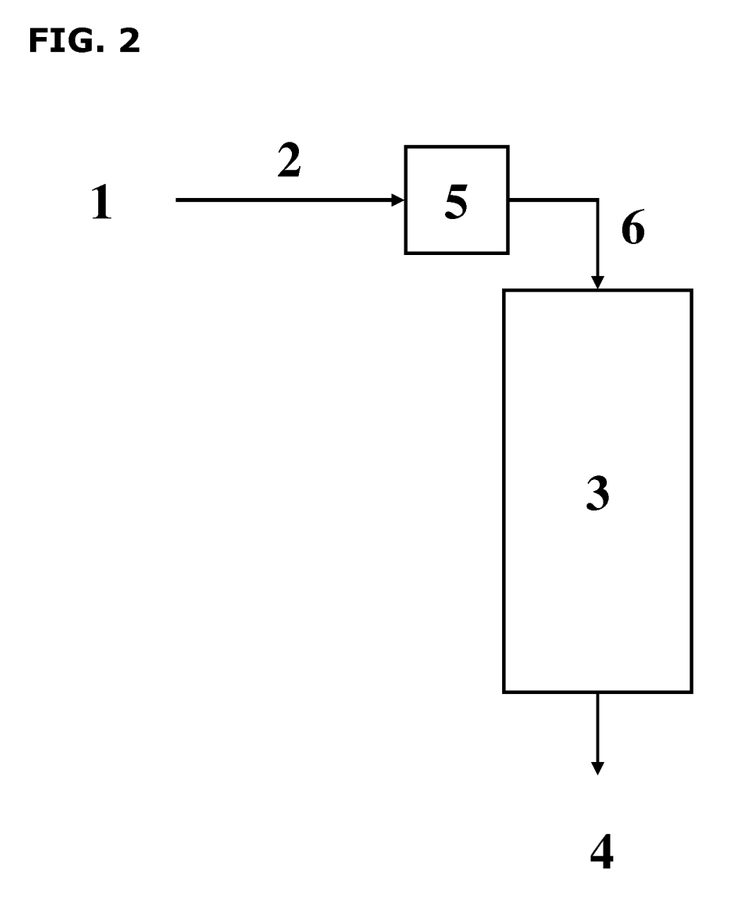
FIG. 2—Represents a schematic process of the invention.

In a second variation, the process for the use of the capture mass described above is carried out by following the various steps referred to in FIG. 2, namely that an effluent 1 is introduced via a line 2 into a drier 5 allowing water to be extracted from the effluent. The effluent obtained at the outlet from the drier is then introduced via a line 6 into a bed comprising at least the capture mass 3 of the invention. The bed of capture mass fixes or adsorbs the mercury contained in the gaseous effluent so as to obtain a gaseous effluent 4 which is cleansed of mercury at the outlet from said bed, i.e. the concentration of mercury in the gaseous effluent at the outlet from the fixed bed is lower than the concentration of mercury in the effluent at the inlet to the bed of capture mass.

The feed for the process of the invention generally corresponds to gaseous or liquid effluents containing heavy metals. Examples that may be cited are combustion fumes, synthesis gas or even natural gas, natural gas liquid cuts, oil, liquid or gaseous oil cuts, and petrochemicals intermediates. The combustion fumes are produced by the combustion of hydrocarbons, biogas, coal in a boiler or by a gas turbine, for example with the aim of producing electricity. These fumes are at a temperature in the range 20° C. to 60° C., a pressure in the range 1 to 5 bars (1 bar=0.1 MPa) and may comprise in the range 50% to 80% of nitrogen, in the range 5% to 40% of carbon dioxide, in the range 1% to 20% of oxygen and a few impurities such as SOx and NOx, if they are not eliminated downstream of the deacidification process.

The synthesis gas contains carbon monoxide CO, hydrogen $H_2$ (generally in a $H_2/CO$ ratio of close to 2), steam (generally saturated at the temperature at which washing is carried out) and carbon dioxide $CO_2$ (of the order of ten percent). The pressure is generally in the range 2 to 3 MPa, but may reach 7 MPa. It also contains sulphur-containing impurities ($H_2S$, COS, etc), nitrogen-containing impurities ($NH_3$, HCN) and halogen-containing impurities.

Natural gas is mainly constituted by gaseous hydrocarbons but may contain several of the following acidic compounds: $CO_2$, $H_2S$, mercaptans, COS, $CS_2$. The quantity of these acidic compounds is highly variable and may be up to 40% for $CO_2$ and $H_2S$. The temperature of the natural gas may be in the range 20° C. to 100° C. The pressure of the natural gas to be treated may be in the range 1 to 12 MPa.

In all cases, the feed to be treated in accordance with the invention contains heavy metals in different forms. As an example, mercury is found in a form known as $Hg^0$, corresponding to elemental or atomic mercury, in the molecular form or in the ionic form, for example $Hg^{2+}$ and its complexes.

The feed to be treated contains heavy metals in varying proportions. Advantageously, a natural gas effluent to be treated contains between 10 nanograms and 1 gram of mercury per $Nm^3$ of gas.

The temperature of the feed to be treated when carrying out the purification process of the invention is generally in the range −50° C. to +200° C., preferably in the range 0° C. to 150° C. and more particularly in the range 20° C. to 100° C. The pressure of the feed to be treated herein is advantageously in the range 0 to 20 MPa, preferably in the range 1 to 15 MPa and more preferably in the range 1 to 12 MPa.

Advantageously, the HSV (volume of feed per volume of capture mass per hour) employed in the purification process of the invention is in the range 500 to 50000 $h^{-1}$. In the case of a gas feed, the hourly space velocity is preferably in the range 4000 to 20000 $h^{-1}$. Preferably, in the case of a liquid feed, the HSV is in the range 0.1 to 50 $h^{-1}$.

The feed to be treated may contain water in varying proportions. The humidity in the gaseous effluents is preferably in the range 0 to 100%, more preferably 0 to 99% and highly preferably in the range 0 to 90%.

EXAMPLES

Example A

Preparation of a Capture Mass M1 in Accordance with the Invention

The support for the capture mass M1 of the invention was prepared via a series of steps:

Preparation of an Alumina Gel, Shaping then Drying and Calcining

The alumina gel was synthesized via a mixture of sodium aluminate and aluminium sulphate. The precipitation reaction was carried out at a temperature of 60° C., a pH of 9, for 60 min and with stirring at 200 rpm. The gel obtained was mixed in a Z arm mixer to produce the paste. Extrusion was carried out by passing the paste through a die provided with an orifice with a diameter of 1.6 mm in the shape of a trilobe. The extrudates obtained were dried at 150° C. then calcined at 500° C.

The characteristics of the support obtained were:
BET surface area: 310 $m^2/g$;
Na content: 30 ppm (weight of $Na_2O$);
Pore distribution, obtained by mercury porosimetry using a wetting angle of 140°:
$V_1-V_{10}=0.02$ mL/g;
$V_{0.1}-V_1=0.02$ mL/100 g;
$V_{0.01}=0.55$ mL/g;
$V_{0.005}/V_{0.03}=10$.

Impregnation then Drying and Calcining

The impregnation solution was prepared by mixing water and copper nitrate so as to provide a final concentration of copper in the final solid (CuO equivalent) of 15% by weight in a stirred tank. The quantity of solution was calculated in order to correspond to the water take-up volume of the support, i.e. to the accessible pore volume. The solution was brought into contact with the support and impregnation was carried out by slowly spraying the support. A maturation step was then carried out in a closed vessel for 3 h. The solid obtained then underwent a drying step at a moderate temperature of 90° C. followed by a calcining step at a higher temperature of 450° C. in a moist atmosphere.

Sulphurization

An ex-situ step for sulphurization, carried out at atmospheric pressure in a 5% molar stream of $H_2S$ (diluted in $N_2$) at a temperature of 150° C., was applied to the prepared capture mass.

Example B

Preparation of a Capture Mass M2 in Accordance with the Invention

Preparation of an Alumina Gel, Shaping then Drying and Calcining

The support for the capture mass M2 of the invention was obtained under the conditions described in Example A.

Impregnation then Drying and Calcining

The impregnation and drying protocol was identical to that described in Example A. The calcining step was carried out in a dry atmosphere.

Sulphurization

The mass was sulphurized under the conditions described in Example A.

Example C

Preparation of a Capture Mass M3 in Accordance with the Invention

Preparation of an Alumina Gel, Shaping then Drying and Calcining

The support for the capture mass M3 of the invention was obtained under the conditions described in Example A. A hydrothermal treatment was then carried out for 3 h at 650° C. in the presence of 30% water.

The characteristics of the support obtained were:
BET surface area: 130 $m^2$/g;
Na content: 10 ppm (weight of $Na_2O$);
Pore distribution, obtained by mercury porosimetry using a wetting angle of 140°:
$V_1-V_{10}$=<0.1 mL/g;
$V_{0.1}-V_1$=0.2 mL/g;
$V_{0.01}$=0.6 mL/g;
$V_{0.005}/V_{0.03}$=3.

Impregnation then Drying and Calcining

The impregnation and drying protocol was identical to that described in Example A. The calcining step was carried out in a dry atmosphere.

Sulphurization

The mass was sulphurized under the conditions described in Example A.

Example D

Preparation of a Capture Mass M4 (Comparative)

The support for the capture mass M4 of the invention was prepared via a series of steps:

Preparation of a Flash Alumina, Shaping then Drying and Calcining

The first step consisted of rapid dehydration of gibbsite at high temperature (800° C.) and with a short contact time (0.8 seconds) in order to obtain a khi transition alumina powder. Washing was used to reduce the $Na_2O$ content using water (3 kg/kg of $Al_2O_3$), followed by a second rapid dehydration treatment similar to the preceding one, in order to obtain an alumina powder. This powder was then shaped in a bowl granulator. A hydrothermal treatment was carried out at a high partial pressure of water (100%) for 8 h. The beads obtained were dried at 150° C. then calcined at 500° C.

The characteristics of the support obtained were:
BET surface area: 110 $m^2$/g;
Na content: 800 ppm (weight of $Na_2O$);
Pore distribution, obtained by mercury porosimetry using a wetting angle of 140°:
$V_1-V_{10}$=0.2 mL/g;
$V_{0.1}-V_1$=0.2 mL/g;
$V_{0.01}$=1.1 mL/g;
$V_{0.005}/V_{0.03}$=1.6.

Impregnation then Drying and Calcining

The impregnation and drying protocol was identical to that described in Example B.

Sulphurization

The mass was sulphurized under the conditions described in Example A.

Example E

Preparation of a Capture Mass M5 (Comparative)

Preparation of a Flash Alumina, Shaping then Drying and Calcining

The support for the capture mass M5, not in accordance with the invention, was obtained under the conditions described in Example D.

The characteristics of the support obtained were:
BET surface area: 110 $m^2$/g;
Na content: 800 ppm (weight of $Na_2O$);
Pore distribution, obtained by mercury porosimetry using a wetting angle of 140°:
$V_1-V_{10}$=0.2 mL/g;
$V_{0.1}-V_1$=0.2 mL/g;
$V_{0.01}$=1.1 mL/g;
$V_{0.005}/V_{0.03}$=1.6.

Impregnation then Drying and Calcining

The impregnation and drying protocol was identical to that described in Example A.

Sulphurization

The mass was sulphurized under the conditions described in Example A.

Example F

Mercury Adsorption Capacity Tests on Capture Masses M1, M2, M3, M4 and M5

The performances of the five capture masses prepared above were evaluated by measuring the increase in mass inside a cylindrical glass reactor $R_1$ with a volume $V_1$=3 L.

Initially, a bead of liquid mercury of approximately 30 g was placed in a glass crucible which was then deposited in the bottom of the reactor $R_1$. A mass $m_m$ of the capture mass of the invention was deposited in a cylindrical glass reactor $R_2$ with volume $V_2$=1 L, which was then introduced into the reactor $R_1$.

The reactor $R_1$ was then introduced into a heating chamber regulated to T=70° C.

Periodically, the reactor $R_2$ was removed, weighed then replaced in the reactor $R_1$.

The increase in the weight of the reactor $R_2$ corresponded to the weight of mercury captured by the capture mass of the invention. The inertia of the glass reactors as regards the mercury adsorption had already been checked. Over a time $t_f$, the weight of the capture mass was not observed to increase.

The weight of mercury, $m_f$, adsorbed over this time $t_f$ is expressed as the relative weight $[Hg]_f$ with respect to the initial mass of the capture mass:

$$[Hg]_f=[(m_f-m_m)/m_m]\times 100$$

and compared with the theoretical weight of mercury, $[Hg]_{th}$, expressed as the relative weight with respect to the initial mass of the capture mass obtained, not in accordance with the invention, by the relationship:

$$[Hg]_{th}=[((m_m\times[S]\times 200.59)/(2\times 32.065\times 100))-m_m)]/m_m\times 100$$

The relative difference between the two values was then calculated from:

$$\Delta[Hg]=[([Hg]_f-[Hg]_{th})/[Hg]_{th}]\times 100$$

The results of the mercury capture measurements are shown in the table below:

| Capture mass | $[Hg]_f$/wt % | $[Hg]_{th}$/wt % | $\Delta[Hg]$/% |
|---|---|---|---|
| M1 (invention) | 17.04 | 14.73 | +15.6 |
| M2 (invention) | 18.32 | 16.48 | +11.2 |
| M3 (invention) | 18.74 | 14.76 | +26.9 |
| M4 (comparative) | 15.34 | 15.55 | −1.4 |
| M5 (comparative) | 8.83 | 13.73 | −35.7 |

These examples demonstrate the higher mercury adsorption capacities that can be obtained by means of the capture masses of the invention.

The capture mass M4, not in accordance with the invention, is slightly over the stoichiometric limit fixed by reaction (1). The capture mass M5, not in accordance with the invention, is substantially over the stoichiometric limit fixed by reaction (1).

The capture masses M1, M2 and M3 of the invention systematically show a significantly improved mercury adsorption performance, not only compared with the capture masses M4 and M5, not in accordance with the invention, but also compared with the stoichiometry imposed by reaction (1).

Example G

Dynamic Mercury Adsorption Capacity Measurements on Capture Masses M1 and M5

A volume $V_m=18$ cm³ of capture mass was introduced into a metal tube reactor; its inactivity as regards mercury fixing had already been established.

The mercury adsorption performances of the capture masses so prepared were tested in a fixed bed apparatus. The tube reactor containing the capture masses was introduced into a break-through apparatus. A gaseous stream of methane containing a feed $[Hg]_e=5000$ µg·Nm$^{-3}$ of mercury was passed through the bed of adsorbents at a flow rate of 300 Nl/h, a temperature of 50° C. and a pressure of 20 bars. The quantity of mercury at the inlet, $[Hg]_e$, and at the outlet from the reactor, $[Hg]_s$, was measured using an in-line analyser. The HSV (volume of feed per volume of capture mass per hour) was equal to 17000 h$^{-1}$.

The quantity of mercury retained inside the bed of adsorbents, $[Hg]_m$, is defined by:

$$[Hg]_m=[Hg]_e-[Hg]_s$$

The efficiency of the capture masses at the end of the test, E, is defined by the relationship:

$$E,\%=100-[([Hg]_e-[Hg]_m)/[Hg]_e]\times 100$$

The results of the various tests are reported in the tables below.

The performances of the capture masses were compared at the same relative times $\tau=t/t_f$, defined as the ratio at time $t_f$ for which the relationship $[Hg]_s=0.1\times[Hg]_e$ is obtained.

| | E/% | |
|---|---|---|
| τ | M1 (invention) | M5 (comparative) |
| 0.1 | 100.00 | 99.14 |
| 0.2 | 100.00 | 98.41 |
| 0.4 | 99.98 | 96.73 |
| 0.6 | 99.59 | 94.77 |
| 0.8 | 97.68 | 92.53 |

The performances of the capture masses may also be expressed with respect to the same mercury absorption efficiency. Thus, the maximum time for using the process during which this efficiency is guaranteed by the bed of adsorbent can be compared.

| | τ | |
|---|---|---|
| E/% | M1 (invention) | M5 (comparative) |
| 99.9 | 0.47 | 0.00 |
| 99.7 | 0.57 | 0.02 |
| 99.5 | 0.62 | 0.05 |
| 99.3 | 0.66 | 0.08 |
| 99.1 | 0.69 | 0.11 |
| 99.0 | 0.70 | 0.12 |

The above examples illustrate the ability of a process in accordance with the invention to offer greater mercury adsorption efficiencies for the same operational period or for longer operational periods, meaning that mercury adsorption efficiency can be maintained beyond a given threshold compared with processes using capture masses which are not in accordance with the invention.

The invention claimed is:

1. A capture mass for heavy metals, capable of capturing mercury contained in a gaseous or liquid feed, said mass comprising a porous support comprising gel alumina obtained from aluminum oxy (hydroxide), at least one metal M present at least in part in a sulfide form said metal M being copper, molybdenum, tungsten, iron, nickel or cobalt and in which the porous support comprises a quantity of sodium in the range 1 to 700 ppm by weight of sodium and has a pore diameter distribution such that:

0.4 mL/g<$V_{0.01}$<0.8 mL/g;

and $V_{0.005}/V_{0.03}$>1;

$V_x$ being the pore volume of the porous support (mL/g) corresponding to the cumulative volume of its porosity, wherein the pore diameter, taken over the whole of the pores of the support, is more than x (in µm).

2. The capture mass according to claim 1, in which the pore diameter distribution is such that:

0.48 mL/g<$V_{0.01}$<0.75 mL/g; and $V_{0.005}/V_{0.03}$>1.8.

3. The capture mass according to claim 1, in which the sodium content is at least 200 ppm by weight or less.

4. The capture mass according to claim 1, containing at least 90% of metal M sulphide in the form $M_xS_y$.

5. The capture mass according to claim 1, having a total pore volume in the range 0.20 to 1 cm$^3$/g and a specific surface area in the range 20 to 400 m$^2$/g.

6. The capture mass according to claim 1, in which the metal M is copper.

7. The capture mass according to claim 1, in the form of extrudates with a trilobe shape.

8. The capture mass according to claim 7, in which the diameters of the extrudates with a trilobe shape are in the range 0.4 to 100 mm.

9. The capture mass according to claim 1, in which the porous support is 100% alumina gel.

10. The capture mass according to claim 1, in which the sodium content is less than 200 ppm by weight or less.

11. The capture mass according to claim 1, wherein the metal M in sulfide form has the formula $M_xS_y$, wherein x≤2 and y≤2.

12. The capture mass according to claim 11, wherein x≤1 and y≤1.

13. The capture mass according to claim 11, wherein x=1 and y=1.

14. A process for preparing a capture mass for heavy metals, capable of capturing mercury contained in a gaseous or liquid feed, said mass comprising a porous support comprising gel alumina obtained from aluminum oxy (hydroxide), at least one metal M present at least in part in a sulfide form said metal M being copper, molybdenum, tungsten, iron, nickel or cobalt, comprising:

a) bringing an aqueous solution of acidic salts into contact with an alkaline solution of aluminium salts or bringing an aqueous solution of acidic aluminium salts into contact with a basic solution containing no aluminium, or bringing an aqueous solution of basic aluminium salts into contact with an acidic solution containing no aluminium;

b) shaping an alumina gel support obtained from a) by mixing the gel in an acidic or basic medium to transform the product into a paste, followed by passing said paste through a die in order to obtain extrudates;

c) drying the alumina support obtained at the end of b) in the range 70° C. to 150° C., followed by calcining it in the range 250° C. to 1300° C.;

d) preparing an aqueous solution containing at least one precursor of dissolved metals that are copper, molybdenum, tungsten, iron, nickel or cobalt;

e) impregnating the solution obtained from d) onto the alumina support obtained from c);

f) maturing the impregnated support from e) in a closed vessel saturated with water at a temperature which is in the range 20° C. to 60° C., for a duration which is in the range 0.5 h to 8 h;

g) drying the solid from f) in the range 70° C. to 250° C.;

i) finally, sulfurizing the solid in the oxide state to form an active sulfide phase $M_xS_y$.

15. The preparation process according to claim 14, in which before i), the solid from g) is calcined in air at high temperature in the range 300° C. to 800° C.

16. The preparation process according to claim 14, in which sulfurization i) is carried out using a gaseous mixture of nitrogen and hydrogen sulfide with a molar concentration in the range 1000 ppm to 10% at a temperature in the range 100° C. to 400° C.

17. A process for the elimination of heavy metals, contained in a gaseous or liquid feed, comprising contacting a capture mass awarding to claim 1 with said feed.

* * * * *